US 9,525,702 B2

United States Patent
Cabot et al.

(10) Patent No.: US 9,525,702 B2
(45) Date of Patent: *Dec. 20, 2016

(54) SIMILARITY SEARCH AND MALWARE PRIORITIZATION

(71) Applicant: Cyberpoint International LLC, Baltimore, MD (US)

(72) Inventors: Charles Cabot, Baltimore, MD (US); Rebecca A. Borbely, Baltimore, MD (US); Michael W. West, Ellicott City, MD (US); Mark V. Raugas, Baltimore, MD (US)

(73) Assignee: Cyberpoint International LLC, Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/843,148

(22) Filed: Sep. 2, 2015

(65) Prior Publication Data

US 2016/0127388 A1    May 5, 2016

Related U.S. Application Data

(63) Continuation of application No. 14/641,503, filed on Mar. 9, 2015, now Pat. No. 9,197,665.

(60) Provisional application No. 62/073,735, filed on Oct. 31, 2014.

(51) Int. Cl.
 *G06F 11/00* (2006.01)
 *H04L 29/06* (2006.01)
 *G06F 17/30* (2006.01)
 *G06F 21/56* (2013.01)

(52) U.S. Cl.
 CPC ............ *H04L 63/145* (2013.01); *G06F 11/00* (2013.01); *G06F 17/30* (2013.01); *G06F 17/3033* (2013.01); *G06F 17/30595* (2013.01); *G06F 17/30864* (2013.01); *G06F 21/564* (2013.01); *H04L 29/06* (2013.01)

(58) Field of Classification Search
 CPC .......................... H04L 63/145; H04L 63/1433
 USPC ......................................................... 726/24
 See application file for complete search history.

(56) References Cited

U.S. PATENT DOCUMENTS

| 8,250,655 | B1 * | 8/2012 | Malanov | H04L 63/145 |
| | | | | 713/165 |
| 8,800,044 | B2 | 8/2014 | Raad | |
| 2010/0058474 | A1 * | 3/2010 | Hicks | G06N 5/02 |
| | | | | 726/24 |
| 2013/0263280 | A1 * | 10/2013 | Cote | G06F 21/62 |
| | | | | 726/26 |

(Continued)

OTHER PUBLICATIONS

Notification of Transmittal of the International Search Report and the Written Opinion of the International Searching Authority, or the Declaration, issued in PCT/US2015/038071 on Sep. 1, 2015, 10 pages.

(Continued)

*Primary Examiner* — Teshome Hailu
(74) *Attorney, Agent, or Firm* — Fish & Richardson P.C.

(57) ABSTRACT

Methods, system, and media for determining similar malware samples are disclosed. Two or more malware samples are received and analyzed to extract information from the two or more malware samples. The extracted information is converted to a plurality of sets of strings. A similarity between the two or more malware samples is determined based on the plurality of the sets of strings.

18 Claims, 4 Drawing Sheets

(56) References Cited

U.S. PATENT DOCUMENTS

2014/0068768 A1    3/2014  Lospinuso

OTHER PUBLICATIONS

Jang, Jiyong et al., BitShred: Fast, Scalable Malware Triage, CMU Technical Reports, Nov. 5, 2010, 16 pages.
Office Action issued in U.S. Appl. No. 14/641,503 on May 6, 2015.
Notice of Allowance issued in U.S. Appl. No. 14/641,503 on Aug. 7, 2015.

* cited by examiner

SIMILARITY SEARCH AND MALWARE PRIORITIZATION

CROSS-REFERENCE TO RELATED APPLICATION

This application is a continuation of U.S. application Ser. No. 14/641,503, filed Mar. 9, 2015, which claims the benefit of U.S. Provisional Application Ser. No. 62/073,735, filed on Oct. 31, 2014, both of which are incorporated herein by reference.

FIELD

This disclosure relates generally to malware analysis, and more particularly to a method, system, and media for performing a similarity analysis on malware samples.

BACKGROUND

Malware, or malicious software, may refer to software that is used to disrupt computer systems and networks. Malware may be analyzed to study and detect threats of malware. However, existing malware analysis services suffer from several deficiencies. For instance, malware analysis services may not be able to keep pace with the rapidly evolving nature of malicious software. Therefore a faster and more efficient method is needed to process files to detect malware. In addition, because numerous malware are generated on a daily basis, a method to prioritize malware samples for analysis is also needed.

SUMMARY

Various implementations are generally directed to malware analysis to overcome the aforementioned problems.

One or more implementations may include a computer-implemented method for processing a malware sample executed by one or more processors. The method includes: receiving two or more malware samples; analyzing, by the one or more processors, the two or more malware samples to extract information from the two or more malware samples; generating, by the one or more processors, at least one set of strings for each of the two or more malware samples using the extracted information; determining, by the one or more processors, a similarity between the two or more malware samples based on the at least one set of strings for each of the two or more malware samples; and providing, by the one or more processors, an output indicating the similarity between the two or more malware samples.

One or more implementations may include a non-transitory computer-readable storage medium encoded with a computer program, the program includes instructions that upon execution by a computer cause the computer to perform operations including: receiving two or more malware samples; analyzing the two or more malware samples to extract information from the two or more malware samples; generating at least one set of strings for each of the two or more malware samples using the extracted information; determining a similarity between the two or more malware samples based on the at least one set of strings for each of the two or more malware samples; and providing an output indicating the similarity between the two or more malware samples.

One or more implementations may include a system having one or more processors and one or more computer storage media storing instructions that are operable, when executed by the one or more processors, to cause the one or more processors to perform operations including: receiving two or more malware samples; analyzing the two or more malware samples to extract information from the two or more malware samples; generating at least one set of strings for each of the two or more malware samples using the extracted information; determining a similarity between the two or more malware samples based on the at least one set of strings for each of the two or more malware samples; and providing an output indicating the similarity between the two or more malware samples.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

Exemplary implementations will now be described in connection with the associated drawings, in which.

DETAILED DESCRIPTION OF THE DRAWINGS

Exemplary implementations are discussed in detail below. While specific exemplary implementations are discussed, it should be understood that this is done for illustration purposes only. In describing and illustrating the exemplary implementations, specific terminology is employed for the sake of clarity. However, the exemplary implementations are not intended to be limited to the specific terminology so selected. A person skilled in the relevant art will recognize that other components and configurations may be used without parting from the spirit and scope of the exemplary implementations. It is to be understood that each specific element includes all technical equivalents that operate in a similar manner to accomplish a similar purpose. The examples and exemplary implementations described herein are non-limiting examples.

A system, method, medium, or computer-based product may provide tools to perform a similarity analysis on two or more malware samples to determine whether the two or more malware samples are similar. The similarity analysis may be performed on a previously unknown sample and a known sample to identify the unknown sample and/or an authorship of the unknown sample. The system, method, medium, or computer-based product may also provide malware prioritization to assist users in prioritizing which malware samples to further analyze.

The system, method, medium, or computer-based product can substantially increase the work productivity of malware analysts and computer incident responders. The system, method, medium, or product may provide users, for example, Information Technology (IT) administrators, novice and intermediate level security experts, with the tools to perform malware analysis with greater efficiency and speed. While, the systems and processes disclosed are described in an example context of malware analysis, however, these systems and processes also may be applicable on other contexts. For instance, the systems and processes described can apply to document similarity searches for any XML or JSON document that has a schema.

Figure 1:
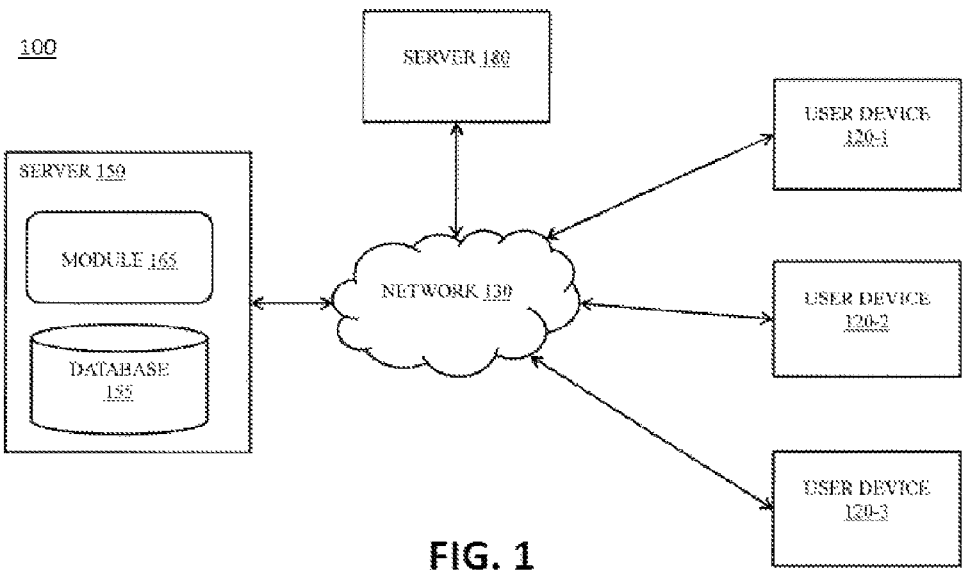
FIG. 1 depicts a block diagram of an exemplary system in accordance with one or more exemplary implementations.

FIG. 1 depicts a block diagram of an exemplary system 100 in accordance with one or more exemplary implementations. System 100 may include one or more user devices, e.g. user device 120-1, user device 120-2, and user device 120-3, network 130, server 150, database 155, module 165, and server 180.

The one or more user devices, e.g., user device 120-1, user device 120-2, and user device 120-3 may be any type of computing device, including a mobile telephone, a laptop, tablet, or desktop computer, a netbook, a video game device, a smart phone, an ultra-mobile personal computer (UMPC), etc. The one or more user devices 120-1, 120-2, and 120-3 may run one or more applications, such as Internet browsers, voice call applications, video game applications, videoconferencing applications, and email, among others. The one or more user devices 120-1, 120-2, and 120-3 may be any combination of computing devices. The one or more user devices 120-1, 120-2, and 120-3 may be coupled to network 130. Users may access module 165 through the network 130 and their respective user devices 120-1, 120-2, and 120-3 to conduct any malware analysis.

Network 130 may provide network access, data transport and other services to the devices (e.g., one or more user devices 120-1, 120-2, and 120-3) coupled to the network 130. In general, network 130 may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, network 130 may implement one or more of a GSM architecture, a General Packet Radio Service (GPRS) architecture, a Universal Mobile Telecommunications System (UMTS) architecture, and an evolution of UMTS referred to as Long Term Evolution (LTE). Network 130 may, again as an alternative or in conjunction with one or more of the above, implement a WiMAX architecture defined by the WiMAX forum. Network 130 may also include, for instance, a local area network (LAN), a wide area network (WAN), the Internet, a virtual LAN (VLAN), an enterprise LAN, a layer 3 virtual private network (VPN), an enterprise IP network, or any combination thereof.

Server 150 or server 180 may also be any type of computing device coupled to network 130, including but not limited to a personal computer, a server computer, a series of server computers, a mini computer, and a mainframe computer, or combinations thereof. Server 150 or server 180 may be a web server (or a series of servers) running a network operating system, examples of which may include but are not limited to Microsoft® Windows® Server, Novell® NetWare®, or Linux®. Server 150 or server 180 may be used for and/or provide cloud and/or network computing. Although not shown in FIG. 1, server 150 and or server 180 may have connections to external systems like email, SMS messaging, text messaging, ad content providers, etc. The features of server 150 may also be implemented in server 180, and vice versa.

Database 155 may be any type of database, including a database managed by a database management system (DBMS). A DBMS may be implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Oracle® database, IBM® DB2, Adaptive Server Enterprise, FileMaker®, Microsoft® Access®, Microsoft® SQL Server, MySQL™, PostgreSQL®, and a NoSQL implementation. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

Module 165 may be configured to send, process, and receive information at server 150. Module 165 may provide another mechanism for sending and receiving data at server 150 besides handling requests through web server functionalities. Module 165 may send and receive information using any technique for sending and receiving information between processes or devices including, but not limited to, using a scripting language, a remote procedure call, an email, a tweet, an application programming interface (API), Simple Object Access Protocol (SOAP) methods, Common Object Request Broker Architecture (CORBA), HTTP (Hypertext Transfer Protocol), REST (Representational State Transfer), any interface for software components to communicate with each other, using any other known technique for sending information from a one device to another, or any combination thereof.

Although module 165 may be described in relation to server 150, module 165 may reside on any other device. Further, the functionality of module 165 may be duplicated on, distributed across, and/or performed by one or more other devices in system 100, either in whole or in part.

Figure 2:
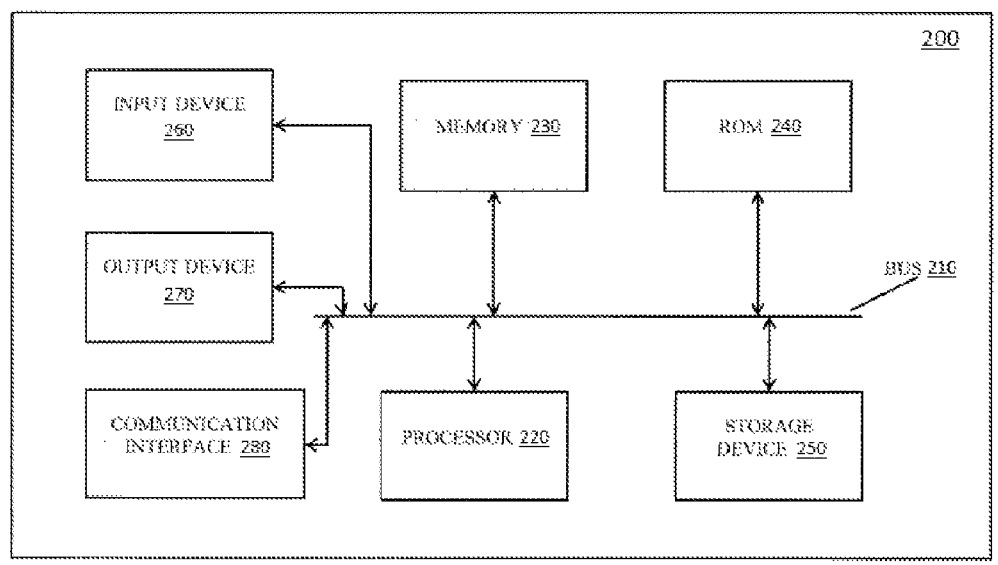
FIG. 2 depicts an exemplary architecture for implementing a computing device in the exemplary system of FIG. 1 in accordance with one or more exemplary implementations.

FIG. 2 depicts an exemplary architecture for implementing a computing device 200 in accordance with one or more implementations, which may be used to implement any of the servers 150, 180 or user devices 120-1, 120-2, and 120-3 described herein, or any other computer system or computing device component thereof. It will be appreciated that other devices that can be used with the computing device 200, such as a client or a server, may be similarly configured. As illustrated in FIG. 2, computing device 200 may include a bus 210, a processor 220, a memory 230, a read only memory (ROM) 240, a storage device 250, an input device 260, an output device 220, and a communication interface 280.

Bus 210 may include one or more interconnects that permit communication among the components of computing device 200. Processor 220 may include any type of processor, microprocessor, or processing logic that may interpret and execute instructions (e.g., a field programmable gate array (FPGA)). Processor 220 may include a single device (e.g., a single core) and/or a group of devices (e.g., multi-core). Memory 230 may include a random access memory (RAM) or another type of dynamic storage device that may store information and instructions for execution by processor 220. Memory 230 may also be used to store temporary variables or other intermediate information during execution of instructions by processor 220. In some implementations, when the server 150 is implemented as a computing device 200, the module 165 may be connected to or include processor 220 to implement the exemplary implementations described herein.

ROM 240 may include a ROM device and/or another type of static storage device that may store static information and instructions for processor 220. Storage device 250 may include, for example, a magnetic disk and/or optical disk and its corresponding drive for storing information and/or instructions. Storage device 250 may include a single storage device or multiple storage devices, such as multiple storage devices operating in parallel. Moreover, storage device 250 may reside locally on the computing device 200 and/or may be remote with respect to a server and connected thereto via network 130 and/or another type of connection, such as a dedicated link or channel.

Input device 260 may include any mechanism or combination of mechanisms that permit an operator to input information to computing device 200, such as, for example, a keyboard, a mouse, a touch sensitive display device, a microphone, a pen-based pointing device, and/or a biometric input device, such as a voice recognition device and/or a finger print scanning device. Output device 270 may include any mechanism or combination of mechanisms that outputs information to the operator, including, for example, a display, a printer, a speaker, etc.

Communication interface 280 may include any transceiver-like mechanism that enables computing device 200 to communicate with other devices and/or systems, such as a client, a server, a license manager, a vendor, etc. For example, communication interface 280 may include one or more interfaces, such as a first interface coupled to a network and/or a second interface coupled to a license manager. Alternatively, communication interface 280 may include other mechanisms (e.g., a wireless interface) for communicating via a network, such as a wireless network. In some exemplary implementations, communication interface 280 may include logic to send code to a destination device, such as a target device that can include general purpose hardware (e.g., a personal computer form factor) and dedicated hardware (e.g., a digital signal processing (DSP) device adapted to execute a compiled version of a model or a part of a model).

Computing device 200 may perform certain functions in response to processor 220 executing software instructions contained in a computer-readable medium, such as memory 230. In alternative implementations, hardwired circuitry may be used in place of or in combination with software instructions to implement features consistent with the exemplary implementations described herein. Thus, implementations consistent with principles of the disclosure are not limited to any specific combination of hardware circuitry and software.

Figure 3:
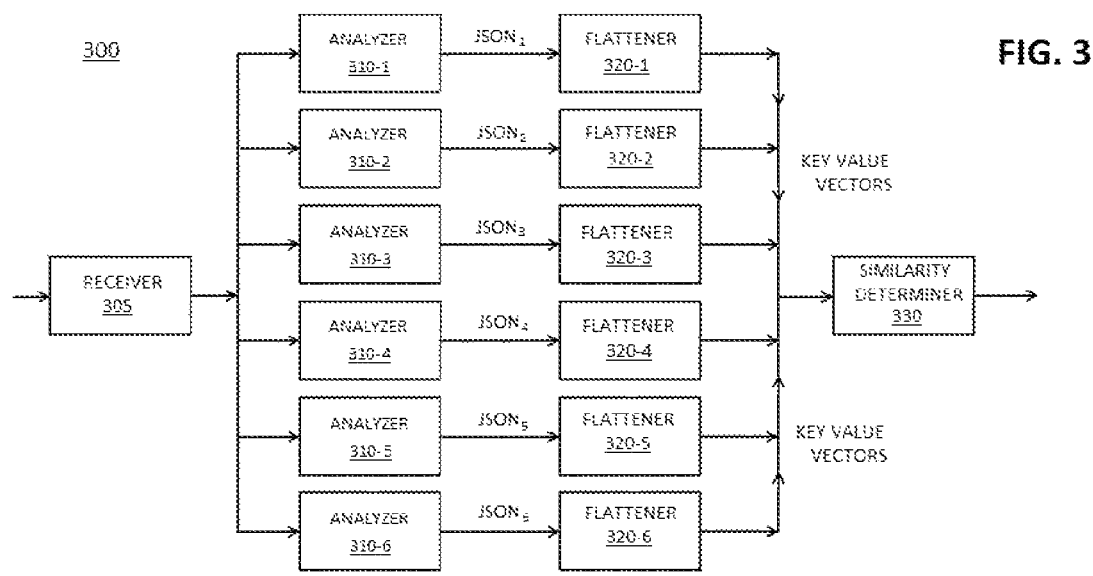
FIG. 3 depicts a block diagram of an exemplary system in accordance with one or more exemplary implementations.

FIG. 3 depicts a block diagram of an exemplary system 300 in accordance with one or more implementations. System 300 may provide a system for processing malware and/or detecting malware that is similar to known malware. System 300 may combine an expandable set of machine learning algorithms and rule sets for automated analysis and processing of malware. System 300 may be implemented in system 100. For example, system 300 may be implemented by module 165, and any related data/information may be stored in database 155.

System 300 may include a receiver 305, one or more analyzers 310-1, 310-2, 310-3, 310-4, 310-5, and 310-6, one or more flatteners 320-1, 320-2, 320-3, 320-4, 320-5, and 320-6, and a similarity determiner 330.

Figure 4:
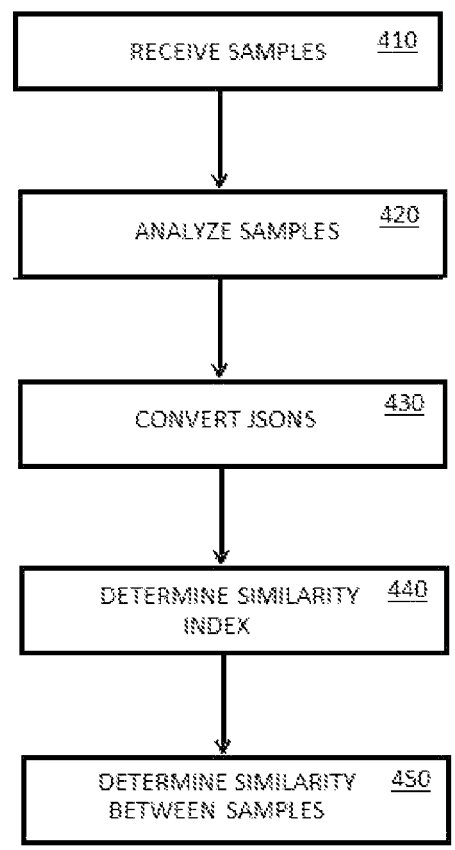
FIG. 4 depicts a block flow diagram of an exemplary method to determine similar malware samples in accordance with one or more exemplary implementations.

FIG. 4 depicts a block flow diagram of an exemplary method 400 to determine similar malware samples in accordance with one or more exemplary implementations. Although exemplary method 400 will be discussed in conjunction with system 300, exemplary method 400 is not limited to execution on system 300, and may be implemented by any system capable of performing or being configured to perform exemplary method 400.

In block 410, one or more samples for malware analysis may be received by a receiver 305 from various input sources. Each of the samples may be a file that is submitted by a user or automatically collected and submitted via a data feed. For example, the samples may be submitted by a user through a web interface. In some instances, the sample may be provided by one or more honeypots that are configured to detect, deflect, or in some manner counteract attempts at unauthorized use of information systems.

In some implementations, a received sample may be stored in a storage unit (e.g., database 155, memory 230) prior to being forwarded to one or more analyzers 310-1, 310-2, 310-3, 310-4, 310-5, and 310-6. Stored samples may be used for various purposes, including, for example, analytical or comparative purposes.

Referring back to FIG. 4, in block 420, a received sample may be analyzed using one of the analyzers 310-1, 310-2, 310-3, 310-4, 310-5, and 310-6, which perform a sequence of configured analytic steps to extract information about the sample. Although FIG. 3 illustrates 6 analyzers, it should be understood that any suitable type and number of analyzers may be used. Each analyzer 310-1, 310-2, 310-3, 310-4, 310-5, and 310-6 may include any single analyzer type or any combination of analyzer types. For example, analyzers 310-1, 310-2, 310-3, 310-4, 310-5, and 310-6 may correspond to one or more of a PE resource analyzer, a PE static imports analyzer, a PE section analyzer, a PE analyzer, a SSDeep analyzer, a FindStrings analyzer, and an IDA Pro analyzer.

An analyzer, for example, analyzers 310-1, 310-2, 310-3, 310-4, 310-5, and 310-6, may refer to a discrete program, script, or environment designed to process a piece of malware (e.g., a sample) in some manner to extract one or more useful pieces of information within or metadata about the malware. The analyzers 310-1, 310-2, 310-3, 310-4, 310-5, and 310-6 may be provided with a complete API of functions for storage, extraction, processing, and reporting on malware. An API, such as a RESTful interface, may be used to make the extracted information available to other computing devices and to upload the file of potential malware. An analyzer may be implemented in any programming language (e.g., Python®, Java® implementations), and may be developed for implementation on any operating system (e.g., Linux®, OS X®, Windows®, etc.). The analyzers 310-1, 310-2, 310-3, 310-4, 310-5, and 310-6, regardless of implementation, may all integrate with the API.

The system 300 may be capable of recursive analysis, in which each analytical outcome of one analyzer within one of the analyzers 310-1, 310-2, 310-3, 310-4, 310-5, and 310-6 could reveal more information to invoke another analyzer in the one of the analyzers 310-1, 310-2, 310-3, 310-4, 310-5, and 310-6. For example, a first analyzer may produce a first analytical outcome as a result of an analysis of a sample. The first analyzer may run a second analyzer, for example, another analyzer different from the first analyzer or even the same first analyzer, to process the first analytical outcome. The first analyzer may call the second analyzer before or after completing its own analysis. The first analyzer may use the results of the run of the second analyzer when performing its analysis.

The analyzers 310-1, 310-2, 310-3, 310-4, 310-5, and 310-6, may process a received sample and generate a result including information about the sample such as, for example, any malware or metadata associated with the sample. Results from the analyzers 310-1, 310-2, 310-3, 310-4, 310-5, and 310-6 may include compiler information, signatures, and function names. The respective outputs (e.g., results) of analyzers 310-1, 310-2, 310-3, 310-4, 310-5, and 310-6 are provided in JavaScript Object Notation (JSON) (i.e., $JSON_1$, $JSON_2$, $JSON_3$, $JSON_4$, $JSON_5$, $JSON_6$).

In some implementations, the output from analyzers 310-1, 310-2, 310-3, 310-4, 310-5, and 310-6 may be provided in Extensible Markup Language (XML). Instructions to and results from the analyzers 310-1, 310-2, 310-3, 310-4, 310-5, and 310-6 may be passed via a heterogeneous set of messaging mechanisms.

Referring back to FIG. 4, in block 430, JSONs output from analyzers 310-1, 310-2, 310-3, 310-4, 310-5, and 310-6 may be converted by creating a list of each parent-child pair (e.g., two-level) in the respective JSON and turning each pair into a string. For example, {"a": ["b", "c"]} in a JSON may be converted to a set of strings {"'a'": "b'", "'a'": "c'"} in the form of key-value vectors, where "a" represents a parent, and "b" and "c" represent children of "a." In some implementations, a list of grandparent-child pairs (e.g., three-level) or any n-level pairs in the respective JSON may be converted into a string. In some implementations, flatteners 320-1, 320-2, 320-3, 320-4, 320-5, and 320-6 may perform the conversion. In general, any suitable device configured to convert the output from analyzers 310-1, 310-2, 310-3, 310-4, 310-5, and 310-6 to one or more sets of strings may be used regardless of whether the output from analyzers 310-1, 310-2, 310-3, 310-4, 310-5, and 310-6 is provided in XML or JSON.

In some implementations, a hashing process may be performed to convert the sets of strings into feature vectors prior to performing a similarity analysis by similarity determiner 330. The hashing process may condense the sets of strings output by flatteners 320-1, 320-2, 320-3, 320-4, 320-5, and 320-6 and aid in processing large numbers of samples and/or large data sets of strings. The information in the output sets of strings may be condensed to a much smaller form that can be stored and compared more efficiently. For example, the hash processor may hash each element of a set to a number (e.g., $i \in \{0, \ldots, K-1\}$) and maintain an array of length K where each entry is 1 if one or more elements were hashed to that index and 0 otherwise. That is, each entry is set to 1 upon the first occurrence of an element being hashed to that index, and the hashing of subsequent elements to the same index would not further increment that index entry, thereby generating a feature vector based on the set of stings. Thus, each sample obtains a feature vector of length K, where each feature is a 1 or a 0, approximating its set of strings. The length, K, is set such that the expected number of hash collisions remains low, as collisions will reduce the accuracy of the approximation. In addition, the hashing process may increase the efficiency with which a similarity index can be determined, as described in more detail below.

The above process may make more efficient use of system resources and improve computation time. For example, a standard sample may have a set of strings with 2,000 elements each of 20 characters, totaling approximately 40 KB. Hashing this set into a key value vector of length, K, of, for example, 12,800 may maintain the expected number of collisions low and also reduce the required storage. For example, in some implementations a key value vector length, K, of 12,800 may both maintain expected number of collisions low and reduce the requires storage to 1.6 kB. In some implementations, K may be larger, thereby, reducing the hash collisions while requiring more storage space, or K may be smaller, thereby, reducing storage space while risking more collisions. In addition, because the calculations of intersections and unions of key value vectors involve simple logic operations and because of integrated bitwise operations in modern chips, a small number of a central processing unit (CPU) cycles may be needed to perform similarity determinations.

In block 440, an similarity index may be determined for a sample by determining a union and an intersection of the set-of-strings data (e.g., key value vectors) output by two or more flatteners 320-1, 320-2, 320-3, 320-4, 320-5, and 320-6, and dividing the intersection by the union. For example, a similarity index of two data sets A and B is equal to:

$$\frac{|A \cap B|}{|A \cup B|}. \qquad \text{(Equation 1)}$$

In implementation including the hash processors, an intersection of two feature vectors may be determined by performing a bitwise AND between two key value vectors and taking a popcount of the result. Likewise, in such implementations, a union of two feature vectors may be determined by performing a bitwise OR between two key value vectors and taking a popcount of the result. Thus, in such implementations, the determination of a similarity index using feature vectors can be performed more efficiently using bitwise operations.

The similarity index may provide an indication of how much the sets overlap. A similarity distance may then be determined by subtracting Equation 1 from 1, such that similar attributes are indicated by a smaller similarity distance, for example:

$$1 - \frac{|A \cap B|}{|A \cup B|}. \qquad \text{(Equation 2)}$$

Based on the similarity distance, a similarity between two samples of malware may be determined (block 450). For example, if the similarity distance between two data sets A and B is 0.1 and the similarity distance between another two data sets A and C is 0.2, the malware sample corresponding to data set A may be determined as being more similar to the malware sample corresponding to data set B and less similar to the malware sample corresponding to data set C. The similarity determiner 330 may perform the functions of determining the similarity index, the similarity distance, and the similarity for two or more data sets.

In some implementations, an similarity distance may be determined from the output of the six flatteners 320-1, 320-2, 320-3, 320-4, 320-5, and 320-6, which may process respective outputs of different types of analyzers, for example, a PE resource analyzer, a PE static imports analyzer, a PE section analyzer, a PE analyzer, a SSDeep analyzer, and a FindStrings analyzer.

In some implementations, an similarity distance may be determined from the output of seven or more flatteners, which may process respective outputs of different types of analyzers, for example, a PE resource analyzer, a PE static imports analyzer, a PE section analyzer, a PE analyzer, a SSDeep analyzer, a FindStrings analyzer, and an IDA Pro analyzer. In general, an similarity distance may be determined from the output of one or more flatteners.

In some implementations, a single output from one of the flatteners 320-1, 320-2, 320-3, 320-4, 320-5, and 320-6 may be processed by the similarity determiner 330 along with a stored set of strings data associated with a stored malware sample to determine a similarity between a received malware sample and a stored malware sample.

In the exemplary implementations described above, a similarity between two malicious samples is determined using a similarity index and similarity distance. In some implementations, a similarity between two malicious samples may be determined using binary distance, which involves taking the Levenshtein distance of, for example, the first 1000 bytes of each binary, where the samples are construed as strings of bytes. A binary distance between two strings may be the minimum number of single-character edits to get from one string to another. A single-character edit may be defined as the insertion, deletion, or substitution of a character. In some implementations, the binary distance may be reduced to the domain of [0,1] by determining:

$$f(a, b) = \frac{LD(a, b)}{\max(|a|, |b|)}.$$ (Equation 3)

In Equation 3, a and b are the byte strings of the binary samples, with one byte considered as one character. The binary distance provides an indication of functional similarity between malware samples because more byte changes may be employed to change a sample into something with very different functionality than something with similar functionality.

In some implementations, a comprehensive similarity measure may be determined by the similarity determiner 330 based on a comparison or combination of the attribute and binary distances between two samples. For example, a comprehensive similarity measure may be determined by weighing and combining the attribute and binary distances between two samples. In some implementations, a user (e.g., IT professional) may assign a weight to the similarity distance and/or the binary distance reflecting a confidence level or preference of the user. For example, the user may assign a higher value to a weight to the similarity measure relative to a weight of the binary distance if the user has greater confidence and/or a preference for an attribute based similarity search. The assigned weights may be used to generate the comprehensive similarity measure. In some implementations, the weights associated with the attribute and binary distances may be set to default values.

The determination of the similarity between malware samples in a fast and efficient manner may have several utilities. One of the several utilities includes utilizing similarity determinations in malware prioritization. Malware prioritization may be helpful to users (e.g., IT professionals) to find an order of malware samples such that samples at the beginning of the order require greater attention than samples lower in the order.

In some implementations, an output associated with the similarity determination may be provided to a user through various means. For example, the output associated with the similarity determination may be provided to a user through a user interface, such as, for example, a display screen. In some implementations, the output associated with the similarity determination may be transmitted to an external system. The output associated with the similarity determination may include data corresponding to at least one of: identification, if available, of the malware samples, a similarity score of the malware samples based on the determined similarity distance, method(s) used to determine the similarity (e.g., comprehensive similarity distance, similarity distance, and/or binary distance), shared characteristics of the malware samples, differing characteristics between the malware samples, authorship of the malware samples, processing time and date of the malware samples, and any additional information that may further characterize the malware samples. The output when received by the external system or user may be used to perform further analysis or studies on the malware samples. Furthermore, the a similarity distance between two samples may represent a similarity of purpose, a similarity of method, or a similarity of authorship between the two or more malware samples.

Figure 5:
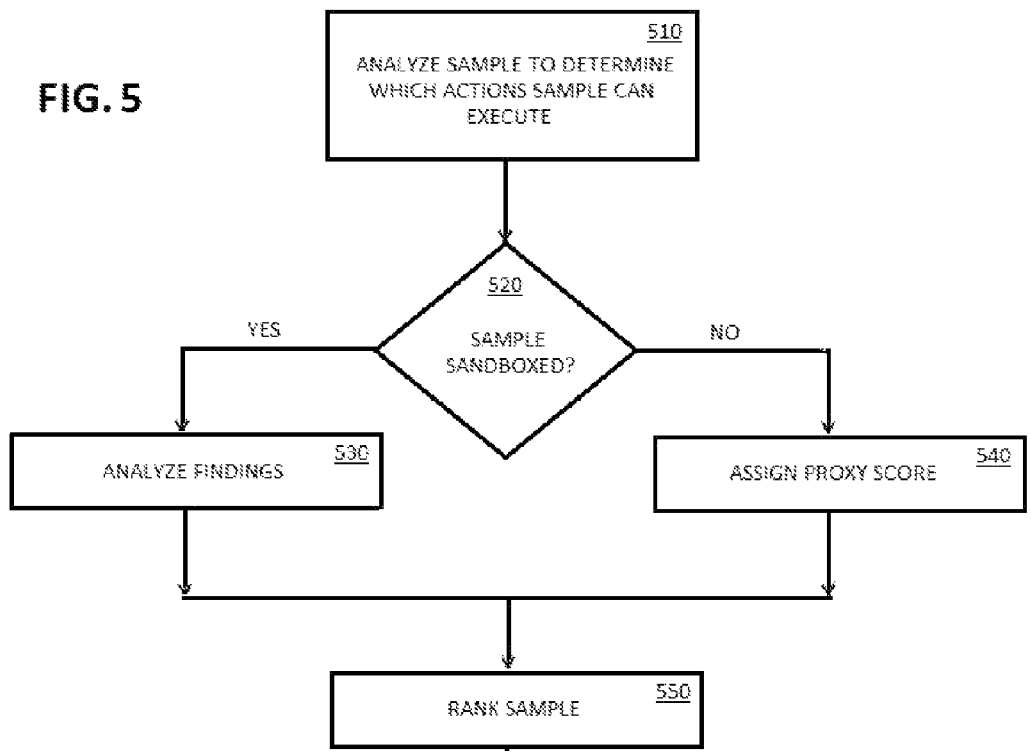
FIG. 5 a block flow diagram of an exemplary malware prioritization method in accordance with one or more exemplary implementations.

FIG. 5 depicts a block flow diagram of an exemplary malware prioritization method 500 in accordance with one or more exemplary implementations. Method 500 may be implemented by module 165, but is not limited thereto, and may be implemented by any system capable of performing or being configured to perform exemplary method 500.

Referring to FIG. 5, in block 510, a malware sample is analyzed to determine which actions the sample can execute. The actions may include any action associated with malware including, but not limited to, stealing sensitive data/files, stealing passwords, remote surveillance and/or control, planting ransom files, planting incriminating information, conducting attacks, using CPU resources, and destroying a system. Although various possible actions can be executed, for the purposes of this example, the eight actions noted above are considered.

Next, a determination is made as to whether the analyzed sample has been sandboxed or not (block 520). If the analyzed sample has been sandboxed, findings from module 165 may be further analyzed to determine a probability of an action (block 530). A mapping m that maps each action to a number of findings that indicate the respective action may be used. Associated with each of these findings is a likelihood that the malware sample is executing the action given the finding. For instance, the mapping be:

$m$(Ransom files)={(FINDING_CRYPTOLOCKER, 1.0),(FINDING_RENAMES_FILES,0.7)}  (Equation 5).

Using this map, a likelihood of each bad action may be determined by multiplying the confidence of the finding by the likelihood from the mapping:

$P$(bad action)=$P$(bad action|finding)$P$(finding)  (Equation 6).

If more than one finding is found for a certain bad action, this calculation is run for each finding and the maximum probability is chosen. [61] If the analyzed sample has not been sandboxed, a proxy score may be assigned to the sample (block 540). To assign a proxy score to the analyzed sample, a prototype sample that has been sandboxed and determined to be similar (e.g., less than $\epsilon$ away for some $\epsilon>0$) to the analyzed sample may be identified, and a score of the prototype sample is assigned to the analyzed sample. If no similar samples are identified, the analyzed sample may be designated as "unknown." In some implementations, the prototype sample may be identified as being similar using the attribute distance, the binary distance, or a combination of the attribute and binary distances as discussed above. In some implementations, clustering efforts may be conducted to find and store prototype samples that represent a cluster of malware similar to them. Accordingly, a number of comparisons needed to find a closest sample and a number of samples that must be sandboxed can be minimized.

Based on the above calculations of the probability and proxy score, the likelihood for a malware sample to execute the 8 actions noted above is determined. To reduce the number of actions considered, user preferences may be considered. For example, users may assign a weight, to an action to indicate which type of action is of greater concern to the user. A final severity score, $s \in [0, 1]$, uses the weights assigned to different actions for a weighted average of the likelihoods ($l_0 \ldots l_7$), as shown in equation 7.

$$s = \frac{\sum_{i=0}^{7} w_i l_i}{\sum_{i=0}^{7} w_i}.$$ (Equation 7)

Equation 7 is shown with i ranging from 0 to n−1, where n is the number of actions being considered. In the described example, n equals 8. However, the range of i may vary based on the number of actions being considered.

After calculating the severity score for one sample, the severity scores for various malware samples may be compared and ranked to generate a priority order for processing of malware samples (block 550). A neutral score or, in some cases, no score, may be assigned to a sample designated as "unknown." In some implementations, a list of the ranked malware samples may be provided for display to a user (e.g., an IT professional) or an external system. This list may include, for each malware sample in the list, data identifying the malware sample (e.g., a filename or a description), the severity score associated with the malware sample, and an identity (e.g., a filename or a description) of any similar malware samples along with respective similarity distances. This priority order may then be referred to by a user to determine an order according to which the user will evaluate malware samples.

Exemplary implementations may be embodied in many different ways as a software component. For example, it may be a stand-alone software package, a combination of software packages, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. It may also be embodied as a software package installed on a hardware device.

Numerous specific details have been set forth to provide a thorough understanding of the implementations. It will be understood, however, that the implementations may be practiced without these specific details. In other instances, well-known operations, components and circuits have not been described in detail so as not to obscure the implementations. It can be appreciated that the specific structural and functional details are representative and do not necessarily limit the scope of the implementations.

It is worthy to note that any reference to "one implementation" or "an implementation" means that a particular feature, structure, or characteristic described in connection with the implementation is included in at least one implementation. The appearances of the phrase "in one implementation" in the specification are not necessarily all referring to the same implementation.

Although some implementations may be illustrated and described as having exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

Some implementations may include an article of manufacture. An article of manufacture may include a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of storage media include hard drives, disk drives, solid state drives, and any other tangible storage media.

It also is to be appreciated that the described implementations illustrate exemplary implementations, and that the functional components and/or modules may be implemented in various other ways which are consistent with the described implementations. Furthermore, the operations performed by such components or modules may be combined and/or separated for a given implementation and may be performed by a greater number or fewer number of components or modules.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While various exemplary implementations have been described above, it should be understood that they have been presented by way of example only, and not limitation. Thus, the breadth and scope of the present disclosure should not be limited by any of the above-described exemplary implementations, but should instead be defined only in accordance with the following claims and their equivalents.

What is claimed is:

1. A computer-implemented method comprising:
   receiving two or more malware samples;
   analyzing, by the one or more computer processors, the two or more malware samples to extract information from the two or more malware samples into an analyzer output, wherein the analyzer output represents relationships between portions of the extracted information in a hierarchical multi-level format;
   generating, by the one or more computer processors, at least one set of strings for each of the two or more malware samples from the analyzer output by expanding hierarchical multi-level formatted information in the output into a string format, wherein the relationships between portions of the extracted information are represented as sets of strings in the string format;
   determining, by the one or more computer processors, a similarity between the two or more malware samples based on the at least one set of strings for each of the two or more malware samples; and providing, for display to a user, an output indicating the similarity between the two or more malware samples.

2. The computer-implemented method of claim 1, wherein the at least one set of strings includes a first set of strings generated from extracted information corresponding to a first malware sample and a second set of strings generated from extracted information corresponding to a second malware sample, and wherein determining the similarity between the two or more malware samples comprises:

determining a similarity index associated with the first set of strings and the second set of strings;

determining a distance based on the similarity index; and determining the similarity based on the distance.

3. The computer-implemented method of claim 1, wherein generating the at least one set of strings for each of the two or more malware samples comprises:

generating two or more respective JSONs for the two or more malware samples using the extracted information; and generating at least one set of strings, respectively, from each of the JSONs.

4. The computer-implemented method of claim 2, wherein determining the similarity index comprises:

determining a union of a first data set associated with the first set of strings and a second data set associated with the second set of strings;

determining an intersection of the first data set and the second data set; and dividing the intersection by the union, and wherein determining the distance based on the similarity index comprises:

subtracting a result of the dividing from one.

5. The computer-implemented method of claim 1, further comprising:

obtaining a hashed set of strings from the at least one set of strings for each of the two or more malware samples, the hashed set of strings having a data size less than respective ones of the at least one set of strings for each of the two or more malware samples.

6. The computer-implemented method of claim 1, further comprising:

determining a priority order for the two or more malware samples based, at least in part, on the similarity between the two or more malware samples.

7. A non-transitory computer-readable storage medium encoded with a computer program, the program comprising instructions that upon execution by a computer cause the computer to perform operations comprising:

receiving two or more malware samples;

analyzing the two or more malware samples to extract information from the two or more malware samples into an analyzer output, wherein the output represents relationships between portions of the extracted information in a hierarchical multi-level format;

generating at least one set of strings for each of the two or more malware samples from the analyzer output by expanding hierarchical multi-level formatted information in the analyzer output into a string format, wherein the relationships between portions of the extracted information are represented as sets of strings in the string format;

determining a similarity between the two or more malware samples based on the at least one set of strings for each of the two or more malware samples; and providing, for display to a user, an output indicating the similarity between the two or more malware samples.

8. The medium of claim 7, wherein the at least one set of strings includes a first set of strings generated from extracted information corresponding to a first malware sample and a second set of strings generated from extracted information corresponding to a second malware sample, and wherein determining the similarity between the two or more malware samples comprises:

determining a similarity index associated with the first set of strings and the second set of strings;

determining a distance based on the similarity index; and determining the similarity based on the distance.

9. The medium of claim 7, wherein generating the at least one set of strings for each of the two or more malware samples comprises:

generating two or more respective JSONs for the two or more malware samples using the extracted information; and generating at least one set of strings, respectively, from each of the JSONs.

10. The medium of claim 8, wherein determining the similarity index comprises:

determining a union of a first data set associated with the first set of strings and a second data set associated with the second set of strings;

determining an intersection of the first data set and the second data set; and dividing the intersection by the union, and wherein determining the distance based on the similarity index comprises:

subtracting a result of the dividing from one.

11. The medium of claim 7, wherein the operations further comprise:

obtaining a hashed set of strings from the at least one set of strings for each of the two or more malware samples, the hashed set of strings having a data size less than respective ones of the at least one set of strings for each of the two or more malware samples.

12. The medium of claim 7, wherein the operations further comprise:

determining a priority order for the two or more malware samples based, at least in part, on the similarity between the two or more malware samples.

13. A system comprising:

one or more processors and one or more computer storage media storing instructions that are operable, when executed by the one or more processors, to cause the one or more processors to perform operations comprising:

receiving two or more malware samples;

analyzing the two or more malware samples to extract information from the two or more malware samples into an analyzer output, wherein the output represents relationships between portions of the extracted information in a hierarchical multi-level format;

generating at least one set of strings for each of the two or more malware samples from the analyzer output by expanding hierarchical multi-level formatted information in the analyzer output into a string format, wherein the relationships between portions of the extracted information are represented as sets of strings in the string format;

determining a similarity between the two or more malware samples based on the at least one set of strings for each of the two or more malware samples; and providing, for display to a user, an output indicating the similarity between the two or more malware samples.

14. The system of claim 13, wherein the at least one set of strings includes a first set of strings generated from extracted information corresponding to a first malware sample and a second set of strings generated from extracted information corresponding to a second malware sample, and
wherein determining the similarity between the two or more malware samples comprises:
determining a similarity index associated with the first set of strings and the second set of strings;
determining a distance based on the similarity index; and
determining the similarity based on the distance.

15. The system of claim 14, wherein determining the similarity index comprises:
determining a union of a first data set associated with the first set of strings and a second data set associated with the second set of strings;
determining an intersection of the first data set and the second data set; and
dividing the intersection by the union, and
wherein determining the distance based on the similarity index comprises:
subtracting a result of the dividing from one.

16. The system of claim 13, wherein generating the at least one set of strings for each of the two or more malware samples comprises:
generating two or more respective JSONs for the two or more malware samples using the extracted information; and
generating at least one set of strings, respectively, from each of the JSONs.

17. The system of claim 13, wherein the operations further comprise:
obtaining a hashed set of strings from the at least one set of strings for each of the two or more malware samples, the hashed set of strings having a data size less than respective ones of the at least one set of strings for each of the two or more malware samples.

18. The system of claim 13, wherein the operations further comprise:
determining a priority order for the two or more malware samples based, at least in part, on the similarity between the two or more malware samples.

* * * * *